(12) United States Patent
Simpson

(10) Patent No.: US 7,515,291 B2
(45) Date of Patent: Apr. 7, 2009

(54) PRINTING DEVICE

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 937 days.

(21) Appl. No.: 10/977,447

(22) Filed: Oct. 29, 2004

(65) Prior Publication Data

US 2006/0092452 A1    May 4, 2006

(51) Int. Cl.
*G06F 3/12* (2006.01)
*G06K 15/00* (2006.01)

(52) U.S. Cl. ............... 358/1.15; 358/1.13; 358/1.1; 358/1.16

(58) Field of Classification Search ............... 358/1.15, 358/1.14, 1.13, 1.1, 1.2, 1.5, 1.6, 1.9, 1.11, 358/1.16, 1.17, 1.18, 400, 401, 404, 407, 358/468, 448; 710/15, 18, 64, 62, 72; 347/1, 347/2, 3, 5, 14, 23, 171; 399/1, 2, 8, 9, 24, 399/25, 27, 28, 29
See application file for complete search history.

(56) References Cited

U.S. PATENT DOCUMENTS

| | | | |
|---|---|---|---|
| 6,094,721 | A | 7/2000 | Eldridge |
| 6,625,402 | B2 | 9/2003 | Takemoto |
| 2002/0097427 | A1 | 7/2002 | Kazama |
| 2003/0101017 | A1* | 5/2003 | Dougherty et al. .......... 702/136 |
| 2003/0103229 | A1 | 6/2003 | Weaver |

OTHER PUBLICATIONS

PCT Search Report dated Mar. 23, 2006, 4 pages.

* cited by examiner

*Primary Examiner*—Dov Popovici
(74) *Attorney, Agent, or Firm*—Matthew L. Wade

(57) ABSTRACT

A server system and a printing device are described. The server system can obtain environmental data that describes at least one environmental condition. The server system can transmit first data to the printing device. The first data is based upon the environmental data.

30 Claims, 12 Drawing Sheets

PRINTING DEVICE

CROSS REFERENCE TO RELATED PATENT APPLICATION

The present application is related to co-pending U.S. patent application Ser. No. 10/903,157 filed Jul. 30, 2004 entitled "Replacement Component For A Printing Device" by inventor Shell S. Simpson. This co-pending United States Patent Application is commonly assigned herewith and is hereby incorporated herein by reference for all that it discloses.

BACKGROUND OF THE INVENTION

As used herein, the phrase "printing device" refers to any device that includes a printing function. Thus, for example, the phrase "printing device" may refer to an inkjet printer, a laser printer, a commercial printing press, a multifunction peripheral (MFP) that includes a printing function, etc. The phrase "laser printer" may refer to any printing device that uses an electro-photographic (EP) process to generate printed output.

The operation of a printing device can be influenced by environmental conditions. For example, the ambient temperature and ambient humidity conditions that exist when a printing device is printing can sometimes resulted in a degradation of print quality and/or influence other aspects of the printing device operation.

Environmental Sensors, such as temperature and humidity sensors, can be placed in a printing device and the printing device can be adapted to adjust various operational parameters based upon the data obtained from these sensors. Unfortunately, environmental sensors can add cost to the printing device.

DETAILED DESCRIPTION OF THE INVENTION

As used herein, the phrase "network service" refers is one or more functions that can be performed by a server system at the request of a client device. As is well known in the art, many client/server systems follow a "remote procedure call" (RPC) protocol to allow a client to remotely invoke a network service that is provided by a server system. The Simple Object Access Protocol (SOAP) is one example of a RPC protocol. Other RPC protocols are provided by the "Common Object Request Broker Architecture" (CORBA), the "Distributed Computing Environment" remote procedure call (DCE-RPC), MS-RPC, XML-RPC, the "Distributed Component Object Model" (DCOM), and the "Remote Method Invocation" (RMI) protocol. It is noted that all these systems and standards (including those yet to be developed) may be used to implement embodiments of the inventions.

As used herein, the phrase "authorization data" refers to data that can be sent from a first computer to a second computer in order to demonstrate to the second computer that the first computer is an "authorized party". An "authorized party" refers to a computing device that has certain authority or privileges. Typically, authorization data is in accordance with a pre-determined protocol that is followed by the first and the second computer. According to some protocols, for example, authorization data is a shared secret that is passed from the first computer to the second computer. The shared secret may be a randomly generated number and/or a large number that that would be hard for an unauthorized part to guess, for example. According to other protocols, for example, authentication data may include an encrypted number (that is encrypted using a secret key) and is passed from the first computer to the second number.

System Overview

Figure 1:
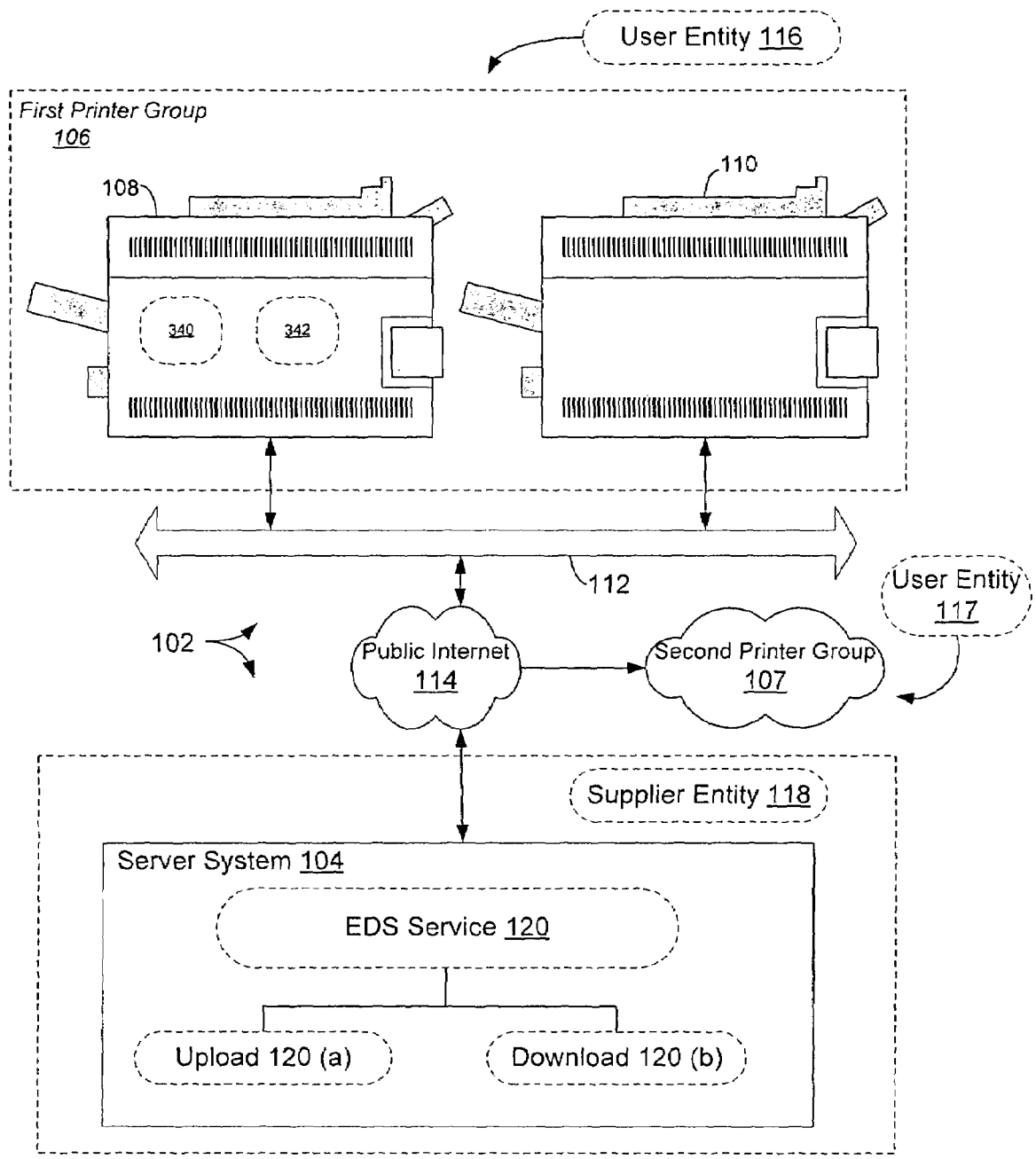
FIG. 1 is a high level block diagram of a computing system according to an embodiment of the invention.

FIG. 1 is a high level block diagram of a computing system 102 that is in accordance with one example embodiment of the invention. As shown, the computing system 102 includes a server system 104, a first group of printers 106 and a second group of printers 107.

The first printer group 106, in this example, includes a first printing device 108 and a second printing device 110. Each of these printing devices is able to communicate with the server system 104 via the Public Internet 114. In some implementations, for example, the two printing devices 108, 110 may be connected to a local intranet 112 that interconnects with the Public Internet 114 through a firewall.

The second printer group 107 may include any number of printing devices. Each printing device from the second printer group 107 can also communicate with the server system 104 via the Public Internet.

In this illustrative example, we will assume that all printers in the first printer group 106 typically experience substantially the same ambient temperature and substantially the same ambient humidity. There may be any number of reasons why this could be true. For example, each printer in the first printer group 106 may be located in proximity to each other, within the same room and/or located within the same building wherein the ambient conditions are kept fairly uniform.

We will further assume that all printers in the second printer group 107 also experience substantially the same ambient conditions (although not necessarily the same ambient conditions as the printers from first printer group 106).

We will further assume in the following discussion that there exists a first user entity 116, a second user entity 117 and a supplier entity 118. The first user entity 116 may represent a business or individual that owns and operates the printers in the first printer group 106.

The second user entity 117 may also represent a business or individual. The second user entity 117 owns and operates the printers in the second printer group 107. It is noted that there may be no relationship between the first user entity 116 and the second user entity 117.

The supplier entity 118 may represent an enterprise that both maintains the server system 104 and sells printing device components, such as replacement print cartridges, to its customers. Both the first user entity 116 and the second user entity 117 may purchase replacement print cartridges from the supplier entity 118, for example.

As shown, the server system 104 provides a network service 120. The supplier entity 118 maintains the server system 104 in order to provide this service for the benefit of its customers. In the following discussion, we may alternatively refer to the network service 120 as the "Environmental Data Sharing" (EDS) service 120 as this network service enables one printing device that has the capability to measure ambient environmental conditions to share these measurements with one or more other pre-selected printing devices.

For example, the first printer 108 includes a temperature 340 and a humidity sensor 342 that allows the first printer 108 to measure ambient temperature and ambient humidity. The EDS service 120 enables the first printer 108 to share environmental data that describes these measurements with the second printer 110. As noted above, both the first printer 108 and the second printer 110 share substantially the same ambient conditions. Therefore, the environmental data that is shared by the first printer 108 to the second printer 110 (via the EDS service 120) can be indicative of the ambient conditions presently being experienced by the second printer 110.

The EDS service 120 can also, for example, enable a printing device from the second printer group 107 to share environmental data with other members of the second printer group 107. Other printer groups (that are not depicted in FIG. 1) may also use the EDS service 120 to share environmental data.

As indicated in FIG. 1, the EDS service 120 includes an environmental data upload function 120 (*a*) and an environmental data download function 120 (*b*). Generally speaking, a printer capable of measuring ambient conditions can use the upload function 120(*a*) to upload environmental data describing these measurements to the server system 104. For ease of discussion, we will refer to a printer that uploads environmental data to the EDS service 120 as a "reporter printer".

The download function 120 (*b*) can be used by a printer to download the environmental data originally uploaded by a particular reporter printer. For ease of discussion, we will refer to a printer that downloads environmental data from the EDS service 120 as a "downloader printer".

In the present embodiment, for example, the first printer 108 may alternatively be referred to as the "reporter printer" 108 as this printer can use the upload function 120 (*a*) to upload environmental data for sharing with the other member of the first group 106 (i.e., the second printer 110). The second printer 110 may alternatively be referred to as the "downloader printer" 110 as this printer can use the download function 120 (*b*) of the EDS service 120 to download environmental data that was originally uploaded by the reporter printer 108.

The second printer group 107, in this example, includes its own "reporter printer" (second printer group reporter printer) and one or more of its own downloader printers. The second printer group reporter printer can use the upload function 120 (*a*) to upload environmental data for sharing with other members of the second printer group. The one or more downloader printers from the second printer group 107 can use the download function 120(*b*) to download this environmental data.

Print Cartridge Construction and Configuration

It is noted that any type of printing device (e.g., inkjet printing devices) may embody the invention. In the present example embodiment, however, the reporter printer 108 and the downloader printer 110 of the first printer group 106 are each laser printers of the type that use a replaceable toner print cartridge.

Figure 2A:
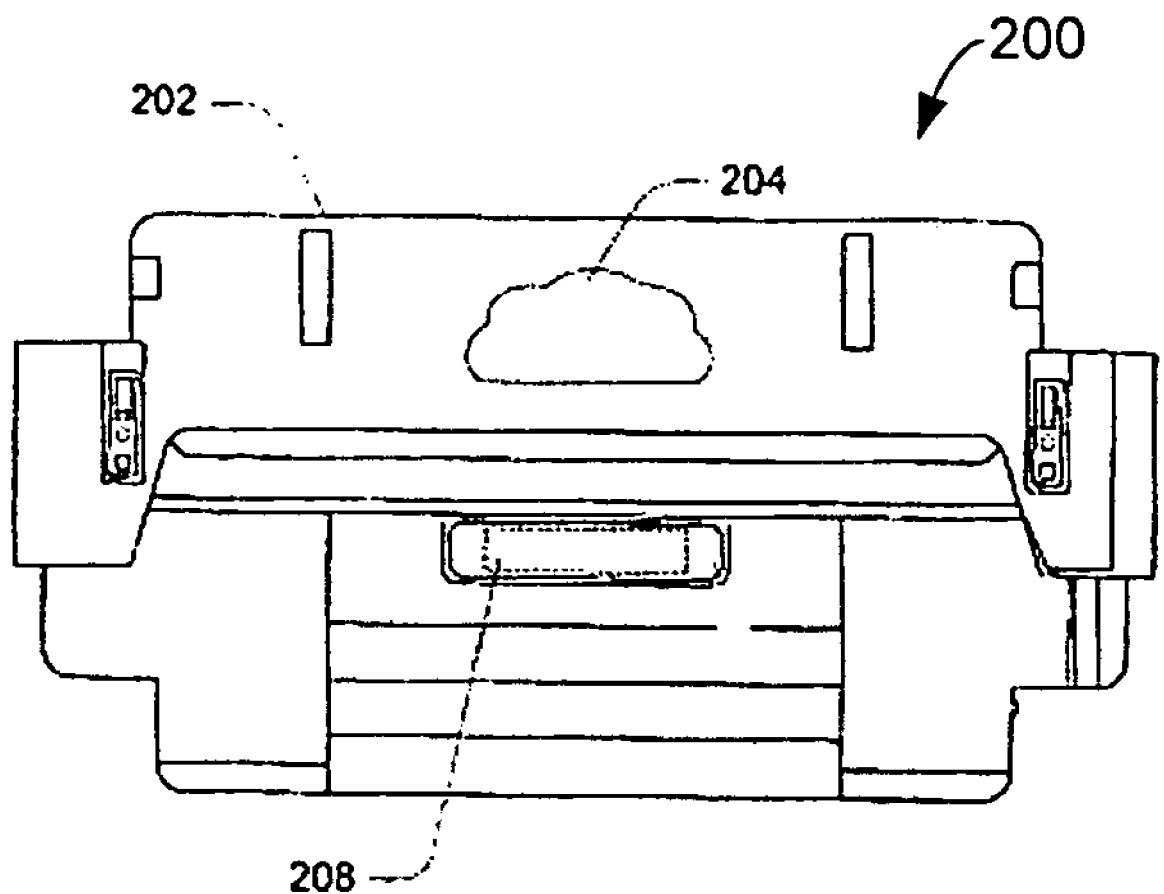
FIG. 2A illustrates an example of a type of print cartridge according to an embodiment of the invention.

FIG. 2A illustrates an example of a type of toner print cartridge 200 that is sold by the supplier entity 118 and that is compatible for use in both the reporter printer 108 as well as the downloader printer 110. As shown in FIG. 2A, the print cartridge 200 includes a housing 202 that contains a supply of toner material 204. The print cartridge 200 further includes a non-volatile memory 208 that is in an integrated part of the print cartridge 200. In this example, the print cartridge memory 208 is permanently attached to an outer surface of the housing 202 as shown.

It is noted that in some specific implementations, for example, the print cartridge memory 208 is of a type that can be accessed over a wireless communication link. In these implementations, the print cartridge memory 208 may represent a radio frequency identification (RFID) tag, for example. In other implementations, for example, the print cartridge memory 208 may be of a type that can be accessed via a hard-wired connection.

As previously noted, the server system 104, in this example, has been set-up by the supplier entity 118 in order to provide the EDS service 120 for the benefit of its customers. In the present embodiment, the supplier entity 118 uses an authorization protocol to prevent unauthorized parties from using the EDS service 120.

In accordance with this protocol, in order for a printer to demonstrate authorization to use the EDS service 120, the printer transmits authorization data to the server system 104. One way for a printer to obtain the authorization data is from the memory of a print cartridge of the type illustrated in FIG. 2A.

Figure 2B:
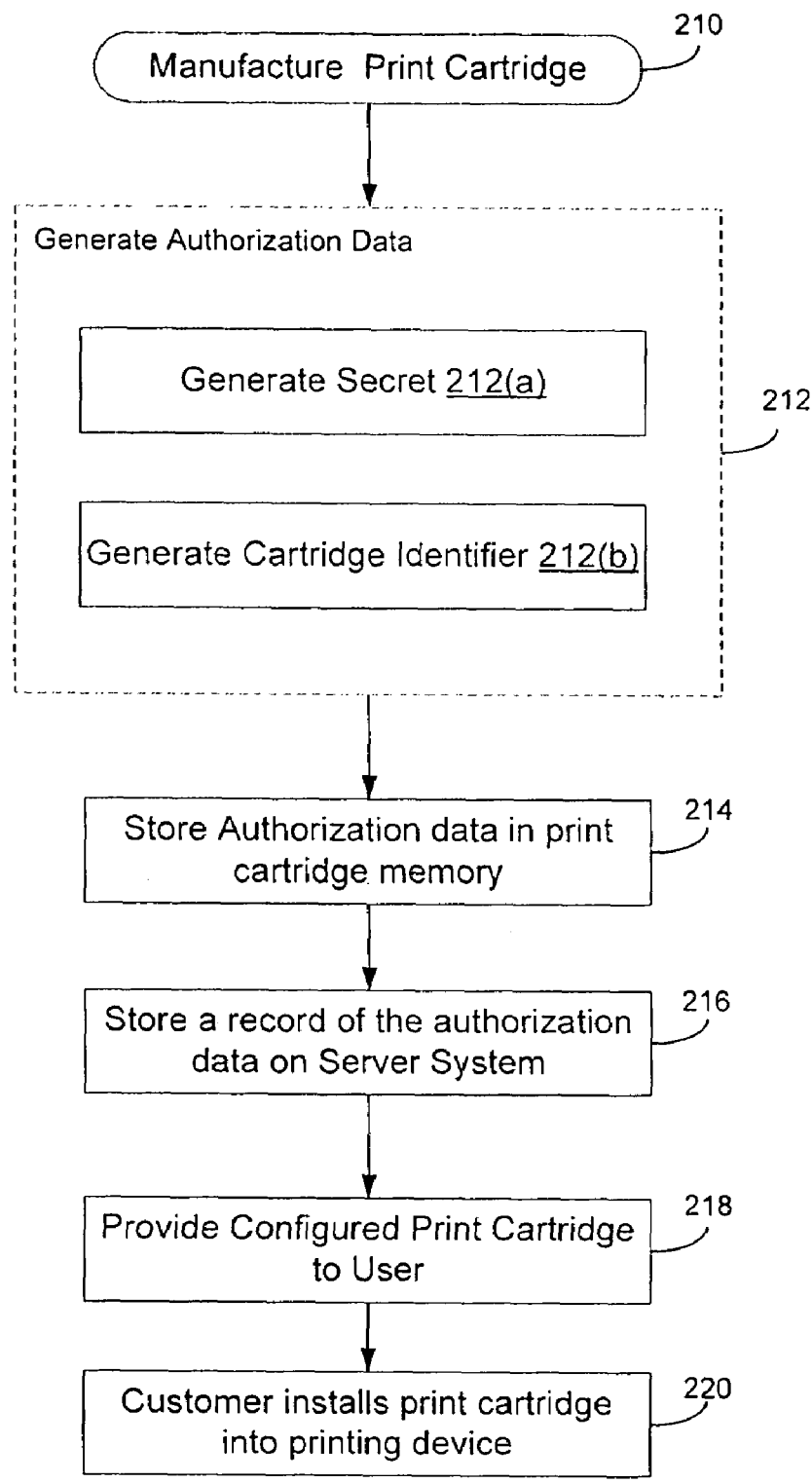
FIG. 2B shows a flow chart that illustrates how a print cartridge may be configured with authorization data according to an embodiment of the invention.

Accordingly, FIG. 2B is a flow chart that illustrates (according to the present example embodiment) how a print cartridge of the type illustrated in FIG. 2A may be configured with authorization data that can be used by a printing device to demonstrate (to the server system 104) that the printing device is authorized to access the EDS service 210.

As shown in FIG. 2B, a print cartridge of the type illustrated in FIG. 2A is manufactured (step 210). At step 212 authorization data is generated. In the present embodiment, step 212 is performed by generating a secret number (step 212 (*a*)) and by generating a unique identifier that can uniquely identify the print cartridge (step 212 (*b*)). In specific implementations, for example, the secret number may be a randomly generated number and/or a large number (e.g., a number greater than 2000 bits) that would be hard for an un-trusted third party to guess.

At step 214, the authorization data is stored in the memory of the print cartridge. At step 216, a record that specifies the authorization data (i.e., the secret number and the print cartridge identifier) is stored in an internal memory (e.g., the server system memory 504 illustrated in FIG. 5) of the server system 104.

At step 218, the print cartridge is provided to a customer (e.g., the first user entity 116 or the second user entity 118).

At step 220, the customer installs the print cartridge in their printing device thereby providing the printing device with access to authorization data that can be used by the printing device to demonstrate authorization to use the EDS service 120.

It is noted that the supplier entity 118 may configure other types of print cartridges in a similar manner. For example, the supplier entity 118 may configure inkjet cartridges that include a memory in a similar manner.

Printing Device Construction

Figure 3:
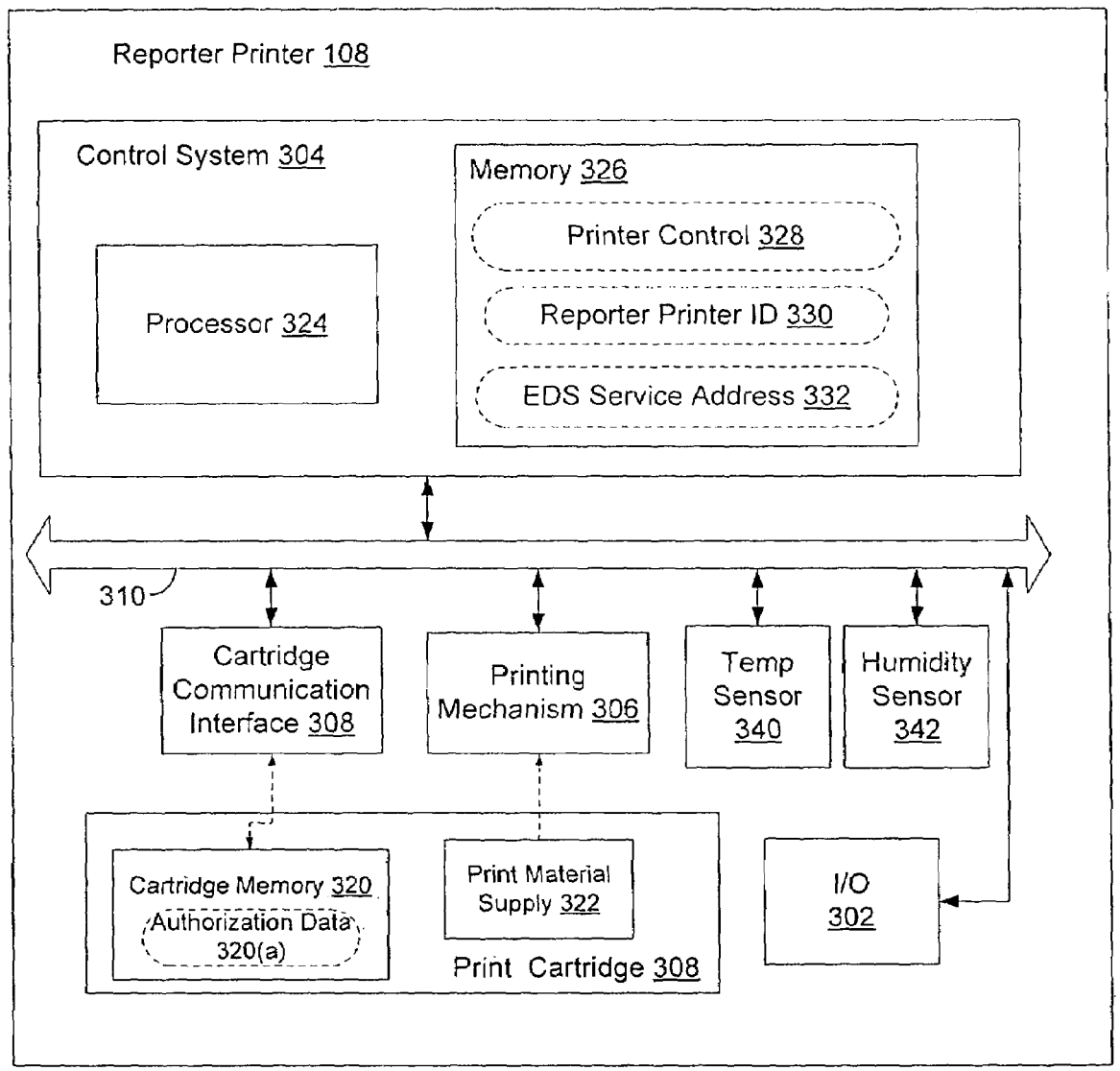
FIG. 3 shows a high-level block diagram of the reporter printer according to an embodiment of the invention.
Figure 4:
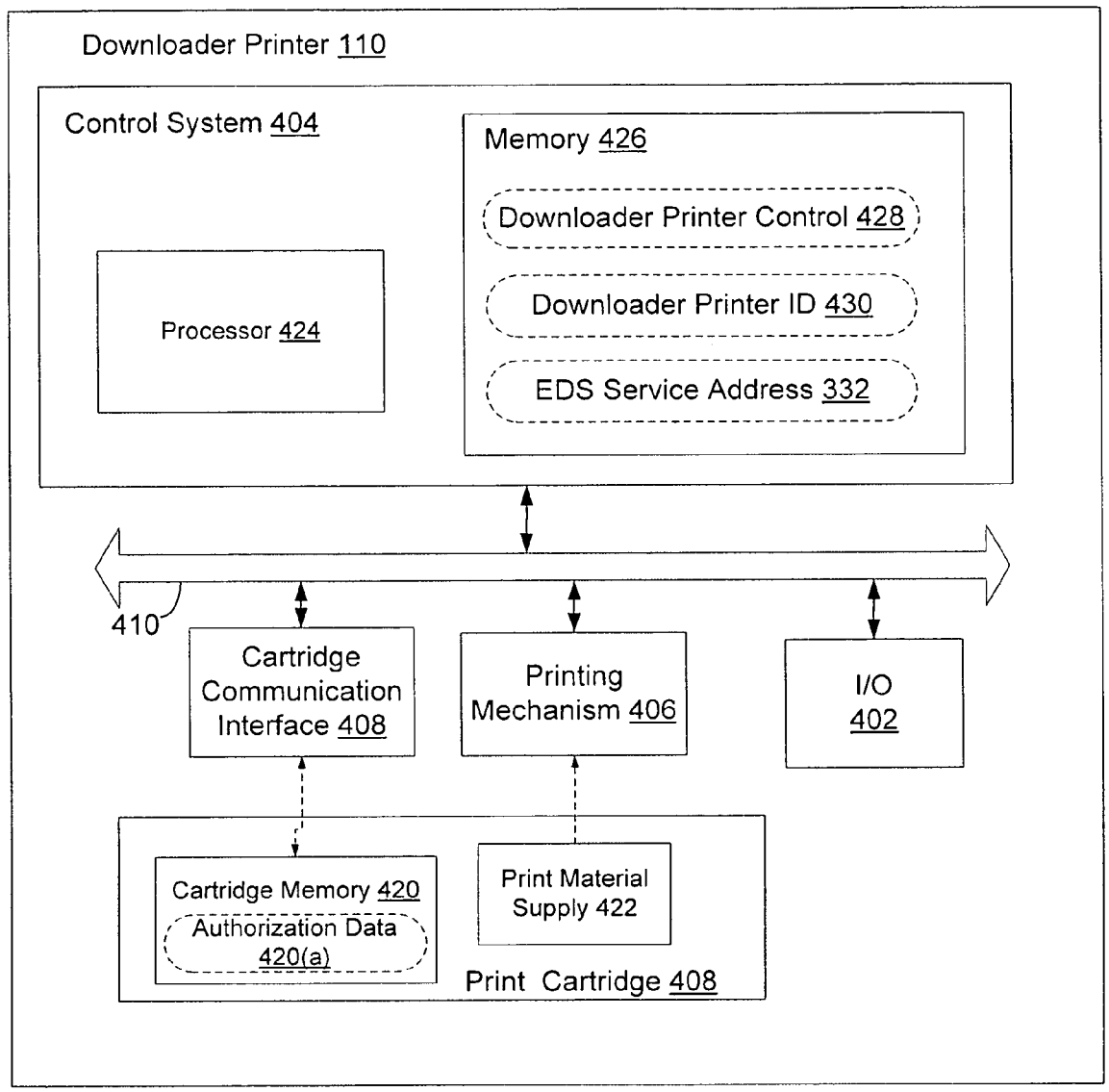
FIG. 4 shows a high level block diagram of the downloader printer according to an embodiment of the invention.

FIG. 3 shows a high-level block diagram of the reporter printer 108 according to an embodiment of the invention. FIG. 4 shows a high level block diagram of the downloader printer 110 according to an embodiment of the invention.

As shown in FIG. 3 and FIG. 4, the two print devices 108/110 may each respectively include, for example, an input-output (I/O) port 302/402, a control system 304/404, a printing mechanism 306/406, a cartridge communication interface 308/408, an installed print cartridge 308/408 and a local bus system 310/410.

In this example, we assume that the two print cartridges 308/408 were each purchased from the supplier entity 118 and are each of the same type as depicted in FIG. 2A. Thus, each of the two print cartridges respectively include a memory 320/420 and a supply of toner print material 322/422.

Furthermore, each print cartridge 308/408 is configured with authorization data by the supplier entity 118 in accordance with the process illustrated in FIG. 2B. Thus, as shown, the two print cartridge memories 320/420 each respectively store authorization data 320(a)/420(a). The server system 104 maintains a record of the authorization data that is stored in each of the two print cartridge memories.

The cartridge memory communication interface 324/424 provides an interface that allows the respective printing device 108/110 to read the authorization data that is stored in the print cartridge memory 320/420. In implementations wherein the print cartridge memory 320/420 is an RFID tag, for example, the communication interface may represent an RFID interrogator, for example. In implementations wherein the print cartridge memory 320/420 is accessible over a hardwired connection, the communication interface may represent a system that establishes a hard wired connection when the print cartridge is installed.

The printing mechanism 306/406 generally enables the respective printing device 108/110 to controllably place marks on a print media. As previously noted, in this embodiment, both printing devices 108/110 are laser printers. The respective printing mechanisms 306/406 may each therefore include a photoconductor and an exposure system for controllably exposing the photoconductor so as to create a latent image. During printing the printing mechanisms 306/406 can uses toner (that can be obtained from the respective print cartridges 308/408) to develop the latent image. The developed latent image may then be transferred (directly or indirectly) to a print media so as to generate printed output.

Also shown in FIG. 3, is the temperature sensor 340 and the humidity sensor 342 that exist within the reporter printer 108. As previously indicated, these two sensors 340, 342 enable the reporter printer 108 to measure ambient temperature and ambient humidity. In the present embodiment, the downloader printer 110 does not include an ambient temperature sensor or an ambient humidity sensor.

Reporter Printer Control System

As shown in FIG. 3, the reporter printer control system 304 may include a processor circuit having a processor 324 and a memory 326. Stored in the memory 324 and executable by the processor 324 is a printer control module 328. The printer control module 328 is executed to control various aspects of the reporter printer 108 operation including the operation (described below) of the reporter printer 108 to upload environmental data to the EDS service 120.

Also stored in the memory 326 is a unique printer identifier (reporter printer (ID)) 330 and the Public Internet address 332 of the EDS service 120. The reporter printer ID 330 is assigned to the reporter printer 108 and can serve to uniquely identify (to the server system 104) the reporter printer 108 over other printing devices. In some implementations, for example, the reporter printer ID 330 is a serial number assigned to the reporter printer 108. In other implementations, for example, the reporter printer ID 330 is a network address that is assigned to the reporter printer 108.

Downloader Printer Control System

As shown in FIG. 4, the downloader printer control system 404 may include a processor circuit having a processor 424 and a memory 426. Stored in the memory 424 and executable by the processor 424 is a printer control module 428. The printer control module 428 is executed to control various aspects of the downloader printer 110 operation including the operation (described below) of the downloader printer 110 to download environmental data from the EDS service 120.

Also stored in the memory 426 is a unique printer identifier (downloader printer ID) 430 and the public internet address 332 of the EDS service 120. The downloader printer ID 430 is assigned to the downloader printer 110 and can serve to uniquely identify (to the server system 104) the downloader printer 110 over other printing devices. In some implementations, for example, the downloader printer ID 430 is a serial number assigned to the downloader printer 110. In other implementations, for example, the downloader printer ID 430 is a network address that is assigned to the downloader printer 108.

Server System Construction

Figure 5:
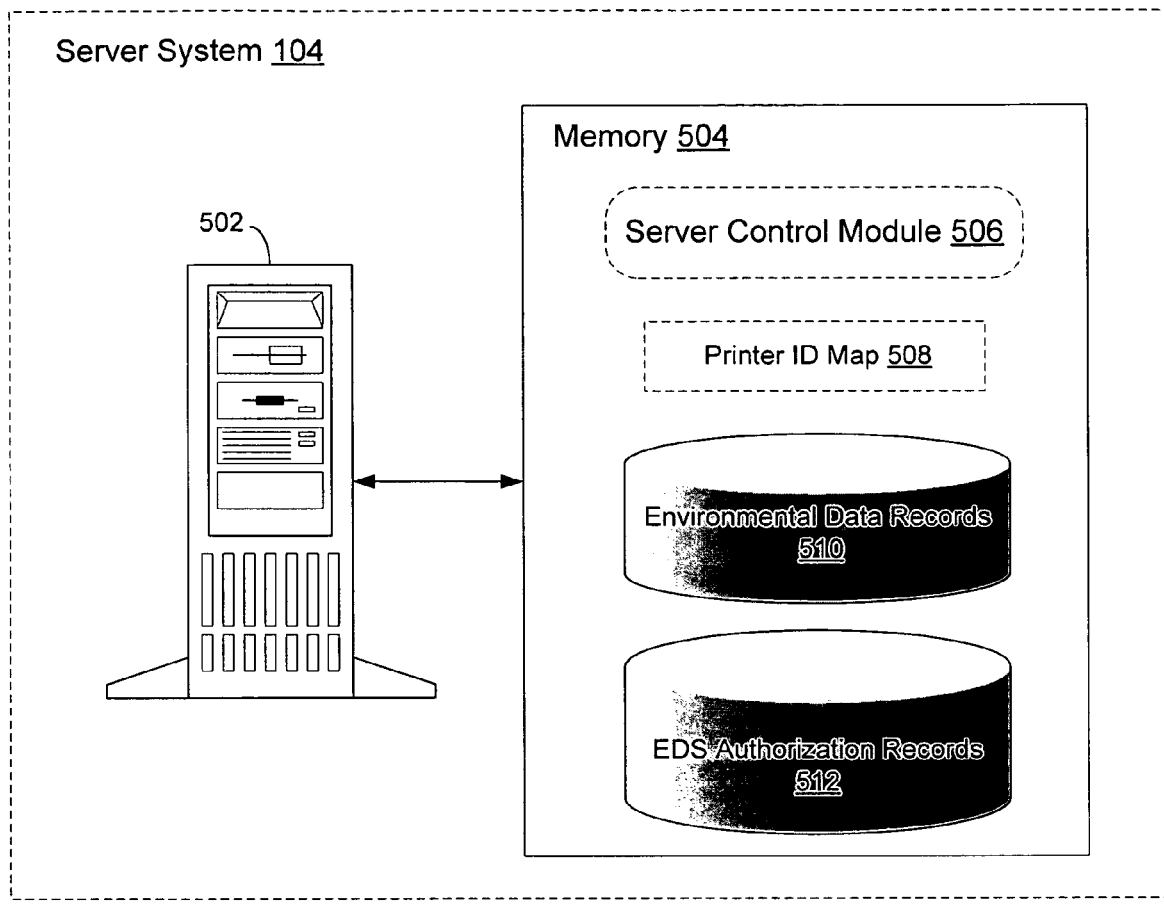
FIG. 5 shows some of the components of a server system according to an embodiment of the invention.

With reference to FIG. 5, shown are some of the components of the server system 104 according to an embodiment of the invention. As shown, the server system 104 may include a server computer 502 and a memory 504.

Stored in the memory 504 is a server control module 506 that is executed by the server computer 502 so as to orchestrate the operations (described below) of the server computer 502 to provide the EDS service 120.

Also stored in the memory is a printer map 506 that, in this example, list the printer identifiers of the printers that presently use the EDS service 120 to share environmental data. For each listed printer, the map 506 logically connects the printer to the appropriate printer group that is using the EDS service 120 to share environmental data.

Thus, for example, the printer map 506 may list the reporter printer ID 330 and the downloader printer ID 430 and identify that these two printers belong to the same printer group (i.e., the first printer group 106) that is using the EDS service 120 to share environmental data.

In a similar manner, the printer map 506 may also list a printer identifier of each printer that is a member of the second printer group 107 and identify that these printers all belong to the same printer group (i.e., the second printer group 107) that is using the EDS service 120 to share environmental data.

Also stored in the memory 506 are two sets of records that are organized respectively within a first and second database 510, 512. The first database (environmental records database) 510 is used to holds the latest upload of environmental data from each reporter printer that uses the EDS service 120.

Thus, for example, the first database 510 is used to hold the record that specifies the environmental data that was last uploaded by the reporter printer 108.

The second database (authorization database) 512 is used to hold records of the authorization data that can be used by a printing device to demonstrate authority to access the EDS service 120. Thus, for example, the authorization database 512 includes a record that specifies the authorization data 320(*a*) that is presently stored in the print cartridge memory 320 and a record that specifies the authorization data 420(*a*) that is stored in the printer cartridge memory 420. The authorization database 512 may also hold records of authorization data that is stored in the memory of other print cartridges that is supplied by the supplier entity 118.

Operation of Reporter Printer

Figure 6A:
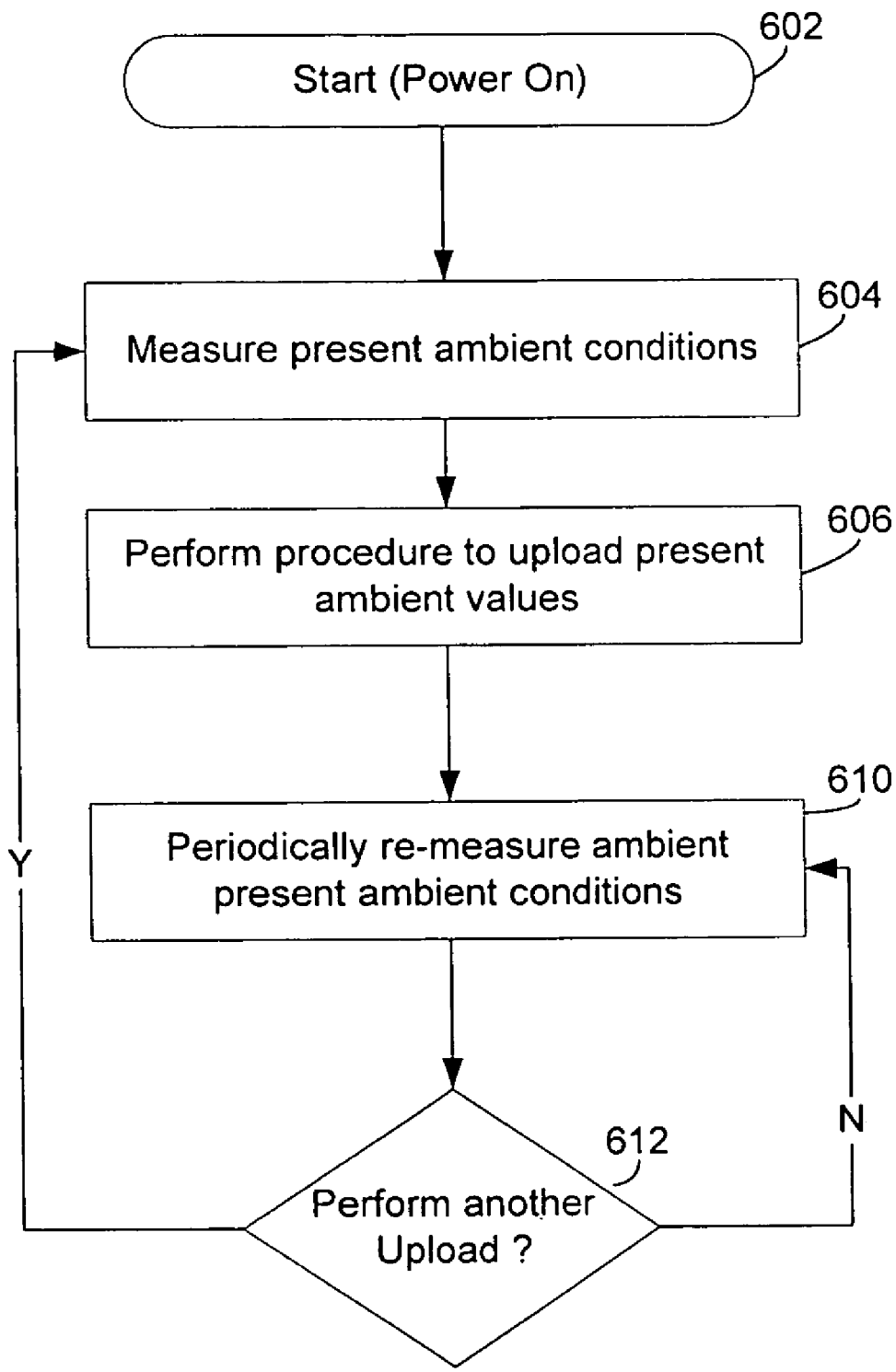
FIG. 6A shows a flow chart that provides one example of the reporter printer operation according to an embodiment of the invention.

With reference to FIG. 6A, shown is a flow chart that provides one example of the reporter printer 108 operation to decide when to upload environmental data to the EDS service 120 according to an embodiment of the invention. Alternatively, the flow chart of FIG. 6A may be viewed as depicting steps of an example method implemented by the reporter printer 108 or by the control system 304 of the reporter printer.

Beginning at box 602, the reporter printer 108 is powered on. After being powered on, the reporter printer 108 proceeds to measure the present value of the ambient temperature and ambient humidity using respectively the temperature sensor 340 and the humidity sensor 342 (box 604). In some implementations, the reporter printer 108 may perform this function automatically or at the request of a user, for example.

At box 606, the reporter printer 108 performs a pre-determined procedure to upload environmental data that describes the measured ambient temperature and ambient humidity values to the EDS service 120.

After performing the initial upload of environmental data to the EDS service 120, the reporter printer 108 may proceed to periodically monitor the environmental sensors 340, 342 to determine if the ambient temperature or the humidity changes. If either the temperature or the humidity change beyond a predetermined amount (e.g., by 5% or more, for example), then the reporter printer 108 proceeds again to box 604 and 606 so as to generate and then to upload new environmental data (that reflects the present ambient temperature and ambient humidity) to the EDS service 120.

In this respect, the reporter printer 108 can keep the EDS service 120 up to date with the present ambient conditions that are being experienced by the first printer group 106.

It is noted that a reporter printer from the second printer group 107 may operate in a similar manner to keep the EDS service 120 up to data with the present ambient conditions being experienced by printers of the second printer group 107.

Reporter Printer Upload Procedure

Figure 6B:
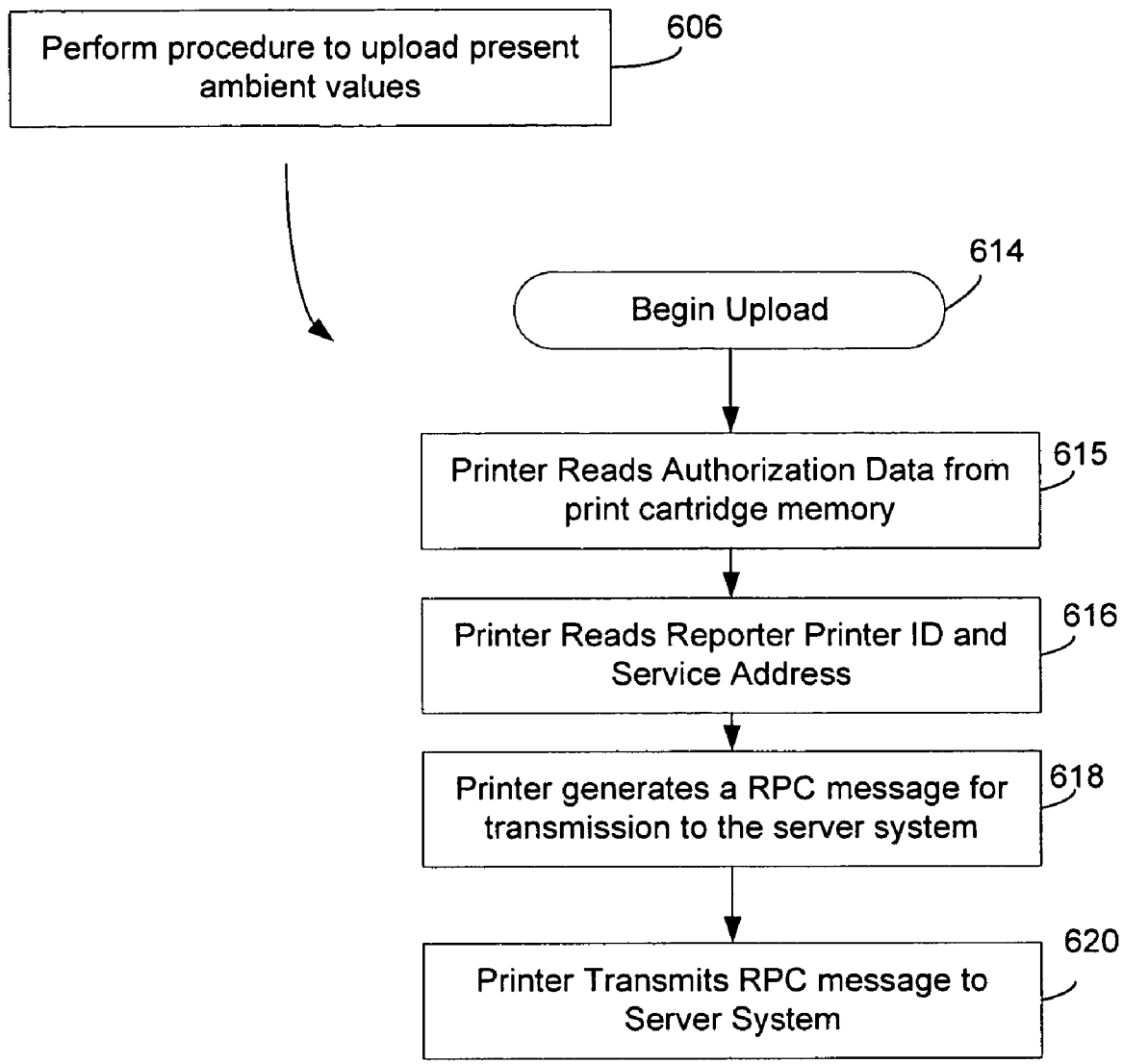
FIG. 6B shows a flow chart that provides one example of the reporter printer operation according to an embodiment of the invention.

With reference to FIG. 6B, shown is a flow chart that provides one example of a procedure the reporter printer 108 may perform (at box 606) in order to upload environmental data to the EDS service 120.

Beginning at box 614, the reporter printer 108 initiates the upload procedure. At box 615, the reporter printer 108 reads the authorization data 320(*a*) from the installed print cartridge memory 320.

At box 616, the reporter printer 108 reads the reporter printer ID 330 and the Public Internet address 330 of the EDS service 120 from the printer memory 326.

At box 618, the reporter printer 108 generates an RPC message to invoke the upload function 120(*a*) of the EDS service 120. The RPC message includes, in this example, the authorization data 320(*a*), the reporter printer ID 330 as well as the environmental data that is to be uploaded.

At box 620, the reporter printer 108 transmits the RPC message to the Public Internet address 330 of the EDS service 120.

Figure 7:
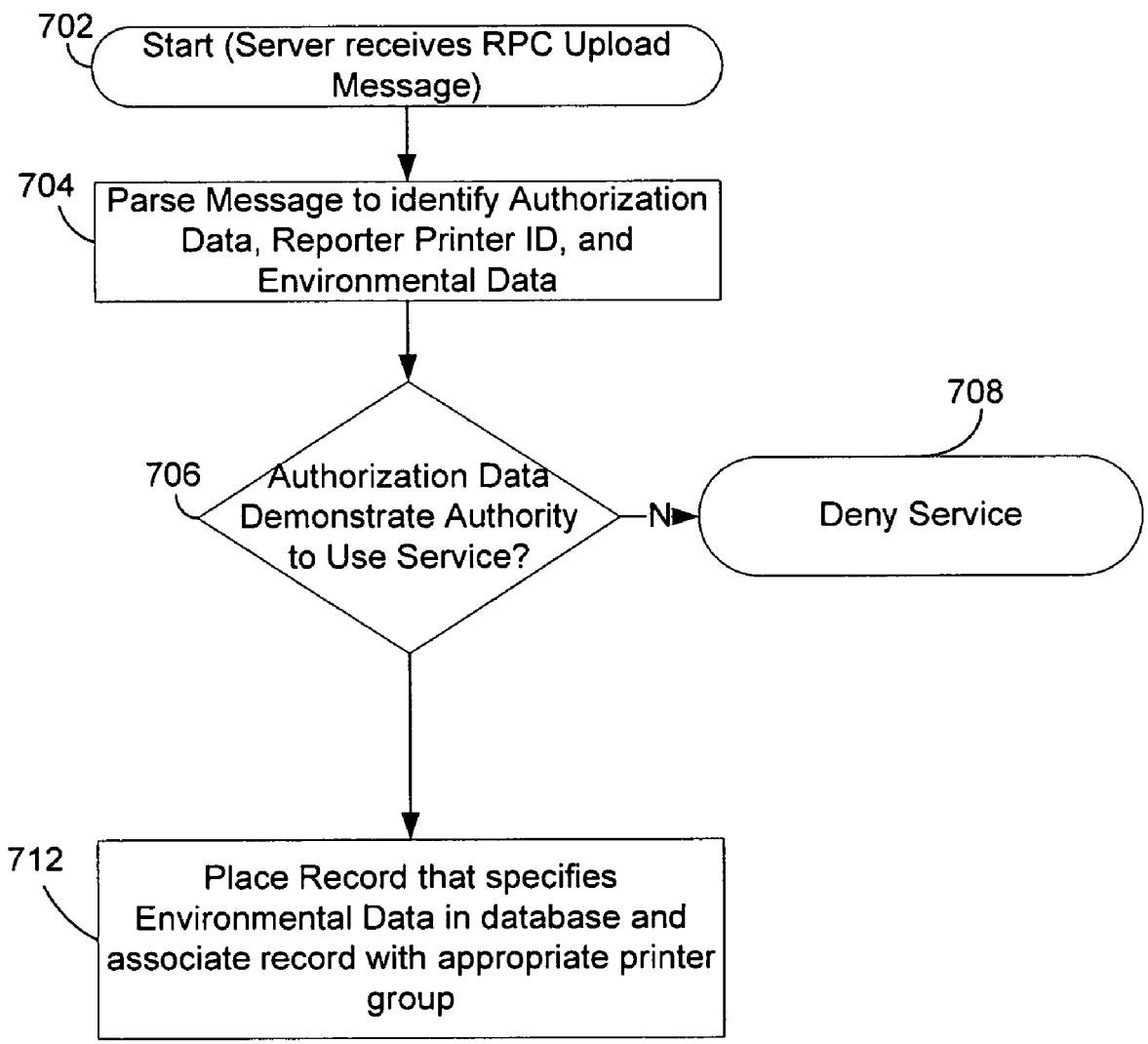
FIG. 7 shows a flow chart that provides one example of how a server system may operate according to an embodiment of the invention.

Operation of Server System to Receive Environmental Data from a Reporter Printer With reference to FIG. 7, shown is a flow chart that provides one example of how the server system 104 may respond to the RPC message transmitted at box 620 according to an embodiment of the invention. Alternatively, the flow chart of FIG. 7 may be viewed as depicting steps of an example method implemented by the server computer 502 while operating under the direction of the EDS service module 506.

Beginning at box 702, the server computer 502 receives the RPC message that was transmitted by the reporter printer 108 at box 620. At box 704, the server computer 502 parses the RPC message by identify the authorization data 320(*a*), the reporter printer ID 330 and the environmental data that is to be uploaded.

At box 706, the server computer 502 decides if the originator (in this case the reporter printer 108) of the current RPC message is authorized to use the EDS service 120. In the present embodiment, this decision is based on whether or not the authorization database 512 is presently holding a record of the authorization data 320(*a*).

If no such record exists, the server computer 502 denies further access to the EDS service 120 (box 708). In response to such a condition, the server computer 502 may then transmit a reply back to originator of the RPC message that access to the EDS service 120 was denied.

If, however, such a record does exist (as is the case in this example) the server computer 502 decides that the originator of the RPC is authorized to access the EDS service 120 and proceeds to box 710.

At box 710, the server computer 502 generates a record and places the record in the environmental records database 510 (box 710). The record specifies the environmental data included in the current RPC message. The record may include additional information to associate it with the member(s) of the appropriate printer group that is using the EDS service 120 to share the environmental data that is uploaded by the reporter printer 108.

For example, the server computer 502 may use the reporter printer ID 330 and the printer map 508 to identify that the downloader printer 110 and the reporter printer 108 are each members of the same printer group that is using the EDS service 120 to share environmental data. The record that is placed in the environmental records database 510 may therefore include information (e.g., the downloader printer ID 430) that indicates that the environmental data specified by the record is intended to be shared with the downloader printer 110.

Operation of Downloader Printer/Server System to Download Environmental Data

Figure 8:
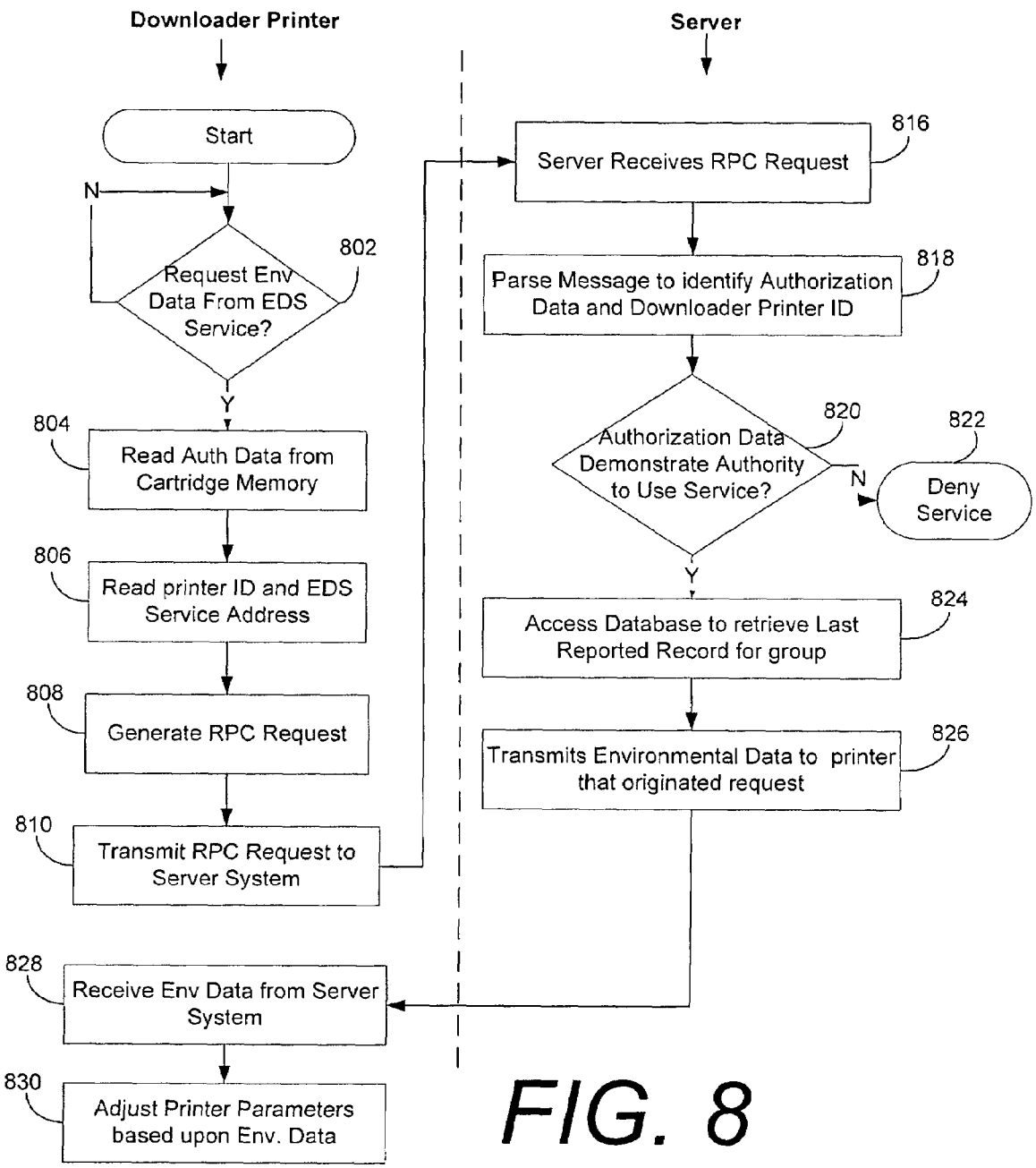
FIG. 8 shows a flow chart that provides one example of how a downloader printer and a server system may interact according to an embodiment of the invention.

With reference to FIG. 8, shown is a flow chart that provides one example of how the downloader printer 110 may interact with the server system 104 so as to download the environmental data that was originally uploaded by the reporter printer 108. Alternatively, the flow chart of FIG. 8 may be viewed as depicting steps of an example method that is performed by the downloader printer 110 and server system 104.

Beginning with box 802, the downloader printer 110 decides to download environmental data from the server system 104. This decision may be made automatically, at the request of a user, or at the request of some external device. For example, in some implementations, the downloader printer 110 may decide to download environmental data periodically (e.g., every hour, for example). In other implementations, the server system 104 may transmit a signal to the downloader printer 110 and the downloader printer 110 is responsive to the signal by initiating a download of environmental data.

At box 804, the downloader printer 110 reads the authorization data 420(a) from the installed print cartridge memory 420. At box 806, the downloader printer 110 reads the downloader printer ID 430 and the Internet address 330 of the EDS service 120 from the memory 426.

At box 808, the downloader printer 110 generates an RPC message to invoke the download function 120 (b) of the EDS service 120. The RPC message includes, in this example, the authorization data 420(a) and the downloader printer ID 430. At box 810, the downloader printer 110 transmits the RPC message to the Internet address 330 of the EDS service 120.

At box 816, the server computer 502 receives the RPC message that was transmitted at box 810. At box 818, the server computer 502 parses the RPC message so as to identify the authorization data 420(a) and the downloader printer ID 430.

At box 820, the server computer 502 decides if the originator (in this case the downloader printer 110) of the current RPC message is authorized to access the EDS service 120. In the present embodiment, this decision is based on whether or not the authorization database 512 includes a record that specifies the authorization data 420(a) that is included in the current RPC message.

If no such record exists, the server computer 502 denies further access to the EDS service (box 822). In response to such a condition, the server computer 502 may then transmit a message back to the originator of the current RPC message that further access to the EDS service 120 is denied.

If, however, such a record does exist (as is the case in this example), the server computer 502 decides that the originator of the RPC message is authorized to access the download function 120(b) and proceeds to box 824.

At box 824, the server computer 502 identifies the record placed in the environmental records database 510 that specifies the last upload of environmental data that was intended to be shared with the originator (i.e., the downloader printer 110) of the current RPC message. Thus, in this case, the server computer 502 identifies the record of environmental data that was last uploaded by the reporter printer 108.

It is noted that the server computer 502 may use the downloader printer ID included in the current RPC message to identify the record as well as the information specified by the record. As previously noted, the information specified by the record may include the downloader printer ID (or ID's) of those printers that are intended to share the environmental data.

At box 826, the server computer 502 transmits the environmental data specified by the record to the originator of the current RPC message. In this case, therefore, the server computer 502 transmits the environmental data to the downloader printer 110.

At box 828, the downloader printer 110 receives the environmental data from the server computer 502.

At box 830, the downloader printer 110 may then use the received environmental data to adjust various internal operational parameters. For example, according to one embodiment, the downloader printer 110 implements a pixel counting algorithm in order to estimate toner usage. The downloader printer 110 may adjust various parameters of this algorithm in order to compensate for the present ambient temperature and ambient humidity conditions indicated by the downloaded environmental data, thereby resulting in an improved toner usage estimate.

OTHER EXAMPLE EMBODIMENTS

According to one alternative embodiment, the device that reports the environmental data for a given printer group may be some other device besides a printing device. For example, any device that can measure and transmit environmental data up to the EDS service 120 could report environmental data to the EDS service 120 for a given printer group.

Figure 9:
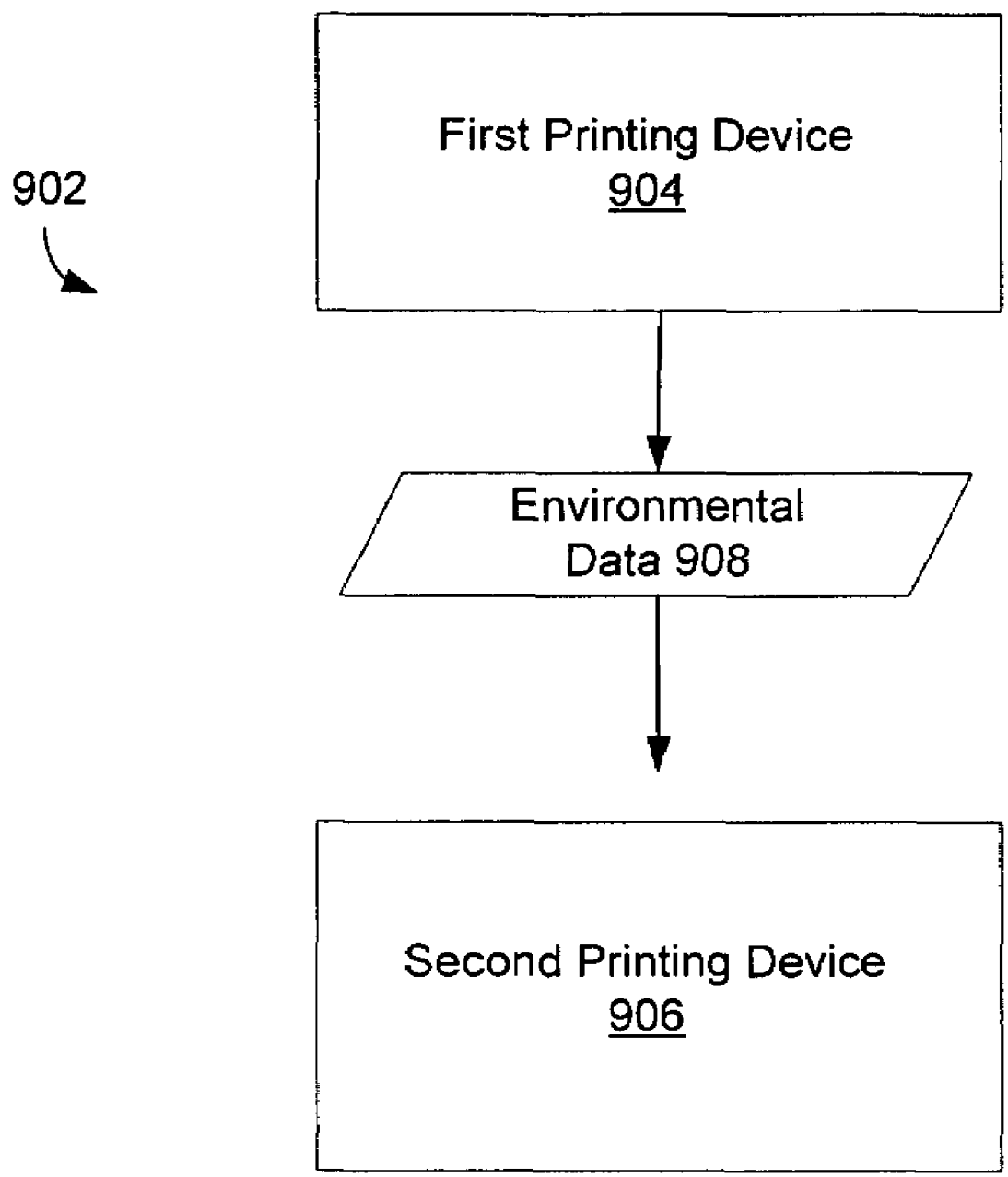
FIG. 9 is a high level block diagram of a computing system that is in accordance with an embodiment of the invention.

FIG. 9 is a high level block diagram of a computing system 902 that is in accordance with another example embodiment of the invention. In this example, the computing system 902 includes a first printing device 904 and a second printing device 906. The first printing device 904 and the second printing device 906 may represent any type of printing device.

The first printing device 904 includes at least one environmental sensor and can transmit environmental data 908 generated by this sensor to the second printing device 906. The first printing device 904 may transmit this data on a periodic basis, at the request of a user or at the request of the second printing device 906, for example. Thus, in this example, the first printing device 904 may be considered a server system that provides environmental data to the second printer device 906. The second printing device 906 may use the environmental data to adjust various operational parameters.

Figure 10:
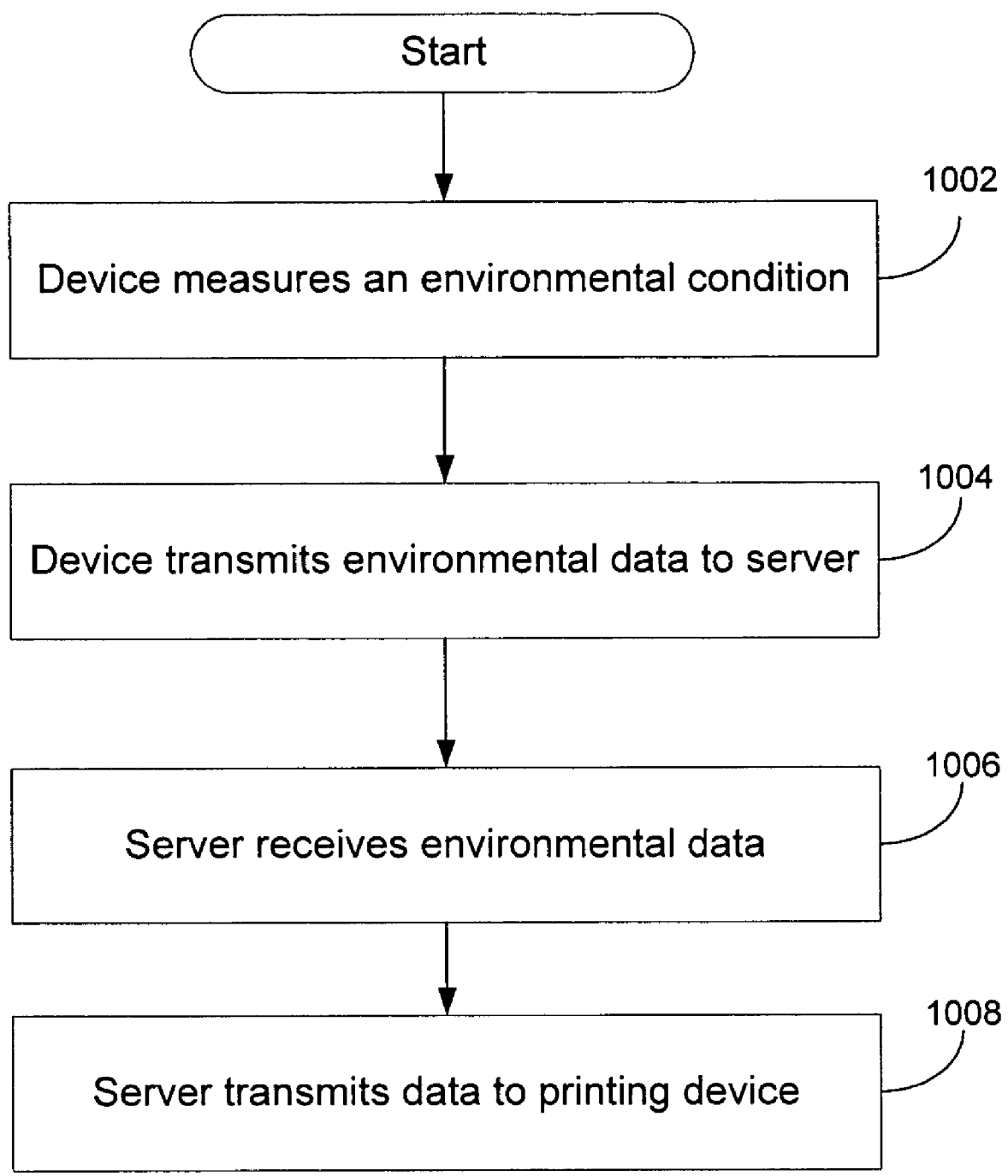
FIG. 10 shows a flow chart illustrating a method implemented by a computing system that is in accordance with an embodiment of the invention.

FIG. 10 is a flow chart illustrating a method implemented by a computing system that is in accordance with another embodiment of the invention. The computing system in this example includes: a reporter device capable of measuring an environmental condition, a server system and a printing device that lacks the ability to measure the environmental condition. In some implementations, the reporter device is a printing device of any type. In other implementations, however, the reporter device is not a printing device. For example, the reporter device may be a computing device that can measure the environmental condition but does not include a printing function.

Beginning with box 1002, the reporter device measures the environmental condition. At box 1004, the device transmits environmental data that describes the measurement to the server system. At block 1006, the server system receives the environmental data from the device.

At block 1008, the server system transmits data to the printing device 1006. The data that is transmitted at block 1008 is based on the environmental data received from the reporter device at box 1006. That is to say, the transmitted data may be copy of the environmental data or could be data that is generated using the environmental data. For example, according to one implementation, the data transmitted at box 1008 may direct the printing device 1006 to adjust certain operational parameters.

It is further noted that the present invention may be embodied in the form of a "computer-readable medium". As used herein, the phrase "computer readable medium" can refer to any medium that can contain, store or propagate computer executable instructions. Thus, in this document, the phrase "computer-readable medium" may refer to a medium such as an optical storage device (e.g., a CD ROM) or a magnetic storage device (e.g., a magnetic tape). The phrase "computer-readable medium" may also refer to signals that are used to propagate the computer executable instructions over a network or a network system, such as the Public Internet.

Thus, a memory component (e.g., the server system memory, reporter printer memory or the downloader printer memory) that stores computer executable instructions (e.g., the EDS Service module, the reporter printer control module and/or the downloader printer control module) may represent an embodiment of the invention. Furthermore, signals used to propagate the software or firmware over a communication link (e.g. an intranet, Public Internet, etc) may also represent an embodiment of the invention.

Although several specific embodiments of the invention have been described and illustrated, the invention is not to be limited to specific forms or arrangements of parts so described and illustrated. The invention is limited only by the claims and the equivalents thereof.

The invention claimed is:

1. A method comprising:
   obtaining from a second printing device, by a server system, environmental data that describes at least one environmental condition;
   transmitting, by the server system, first data to a first printing device if the first printing device and the second printing device belong to a predefined group of printers that is denoted by the server as sharing the environmental data; and
   wherein the first data is based upon the environmental data.

2. The method of claim 1, further comprising:
   receiving, by the first printing device, the first data that is based upon the environmental data; and
   responding, by the first printing device, to the first data by modifying at least one operational parameter of the first printing device.

3. The method of claim 1, further comprising:
   measuring, by the second printing device, the at least one environmental condition;
   generating, by the second printing device, the environmental data; and
   transmitting, by the second printing device, the environmental data to the server system.

4. The method of claim 3, wherein the measuring step includes measuring an ambient temperature and an ambient humidity presently being experienced by the second printing device.

5. The method of claim 4, wherein the first printing device is not capable of measuring ambient temperature or ambient humidity.

6. The method of claim 1, if the first printing device and the second printing device do not belong to the predefined group of printers, inhibiting the transmitting.

7. In a server system, a method comprising:
   receiving a first remote procedure call (RPC) message from a first printing device different from the server system, where the first RPC message includes environmental data;
   responding to the first RPC message, at least in part, by storing a record of the environmental data in the server system;
   receiving, a second RPC message from a second printing device different from the server system; and
   responding to the second RPC message, at least in part, by transmitting the environmental data from the server system to the second printing device, wherein the first printing device and the second printing device are each members of a group of printing devices that have been pre-selected to share environmental data.

8. The method of claim 7,
   wherein the first RPC message includes authorization data obtained from a memory of a print cartridge installed in the first printing device; and
   wherein the second RPC message includes authorization data obtained from a memory of a print cartridge installed in the second printing device.

9. A server system, comprising:
   means for receiving environmental data from a first printing device different from the server system; and
   means for sharing the environmental data with at least one other pre-selected printing device different from the server system.

10. The server system of claim 9, wherein the environmental data describes at least one ambient condition.

11. The server system of claim 10, wherein the pre-selected printing device does not have the capability to measure the at least one ambient condition.

12. The server system of claim 10, wherein the receiving means receives the environmental data over the Public Internet and the sharing means shares the environmental data by transmitting the environmental data to the pre-selected printing device over the Public Internet.

13. The server system of claim 9, wherein the first printing device and the at least one other pre-selected printing device belong to a predefined group of printers that is denoted by the server as sharing the environmental data.

14. In a downloader printer, a method comprising:
   reading authorization data stored in a memory of a print cartridge presently installed in the downloader printer;
   transmitting an RPC message, including the authorization data, to a server system, wherein the RPC message is a request to invoke a function of a network service of the server system to provide environmental data to the downloader printer, wherein the server system uses the authorization data to determine if the downloader printer is authorized to invoke the function; and
   receiving the environmental data from the server system if the downloader printer is authorized to invoke the function, the environmental data originally provided to the server system by a reporter printer.

15. The method of claim 14, wherein the authorization data includes a print cartridge identifier that uniquely identifies the print cartridge and a secret number, wherein the downloader printer is authorized to invoke the function if the print cartridge identifier and the secret number are included in a pre-stored record on the server system.

16. The method of claim 14, wherein the downloader printer and the reporter printer belong to a predefined group of printers that is denoted by the server as sharing the environmental data.

17. A printing device including a print engine for generating printed output, the printing device comprising:
   a control system configured to cause the printing device to transmit a RPC message to a server system, where the RPC message is to cause the server system to perform a pre-determined procedure that results in the server system transmitting environmental data to the printing device, the environmental data previously received by the server system from another printing device belonging to a pre-selected group of printers that includes the printing device.

18. The printing device of claim 17, wherein the environmental data was originally received by the server system from another printing device.

19. The printing device of claim 17, wherein the RPC message further includes authorization data obtained from a memory of a print cartridge installed in the printing device and included in the RPC message, and wherein the environmental data is transmitted from the server to the printing device only if the authorization data has been prestored in a database in the server.

20. The printing device of claim 17, wherein the pre-selected group comprises printing devices that experience substantially the same environmental conditions.

21. The printing device of claim 17, wherein the RPC message further includes a printer identifier that uniquely identifies the printing device, the printer identifier usable by the server system to select a record that contains the environmental data from a database on the server system.

22. A print cartridge, comprising:
(a) a supply of print material; and
(b) a memory attached to the print cartridge;
wherein the memory stores data that enables a printing device to demonstrate authority to access at least one function of a network service;
wherein the network service enables a pre-selected group of printing devices to share environmental data.

23. The print cartridge of claim 22, wherein the print material is dry toner.

24. The print cartridge of claim 22, wherein the print material is liquid toner.

25. The print cartridge of claim 22, wherein the print material is ink.

26. One or more computer-readable media encoded with computer-executable instructions that, when executed by a server computer, cause the server computer to perform the following steps:
receiving a first remote procedure call (RPC) message from a first printing device, where the first RPC message includes environmental data and authorization data obtained from a memory of a print cartridge;
responding to the first RPC message, at least in part, by determining if the authorization data demonstrates the first printing device is authorized to access a first function of a service provided by the server computer;
if the first printing device is determined to the authorized, then performing the first function by placing a record of the environmental data in a database;
receiving, a second RPC message from a second printing device, where the second RPC message includes authorization data obtained from a memory of a print cartridge;
responding to the second RPC message, at least in part, by determining if the authorization data demonstrates that the second printing device is authorized to access a second function of a service provided by the server computer; and
if the second printing device is determined to be authorized, then retrieving the record of the environmental data and transmitting the environmental data to the second printing device.

27. The computer-readable media of claim 26, wherein the authorization data comprises a cartridge identifier unique to the print cartridge and a secret number.

28. The computer-readable media of claim 26,
wherein the responding to the first RPC message includes determining if an authorization database in the server contains a prestored record of the authorization data of the first RPC message, and
wherein the responding to the second RPC message includes determining if the authorization database contains a prestored record of the authorization data of the second RPC message.

29. The computer-readable media of claim 26, wherein the placing a record of the environmental data in a database includes
determining that the second printing device and the first printing device belong to a predetermined group of printers that experience substantially the same environmental conditions; and
associating the environmental data with the second printing device.

30. The computer-readable media of claim 29, wherein the retrieving the record of the environmental data includes
locating the record in the database for which the environmental data is associated with the second printing device.

* * * * *